Oct. 27, 1925.
A. STRASSER
1,559,471
LEAD ELECTRODE FOR ACCUMULATORS
Filed March 5, 1924
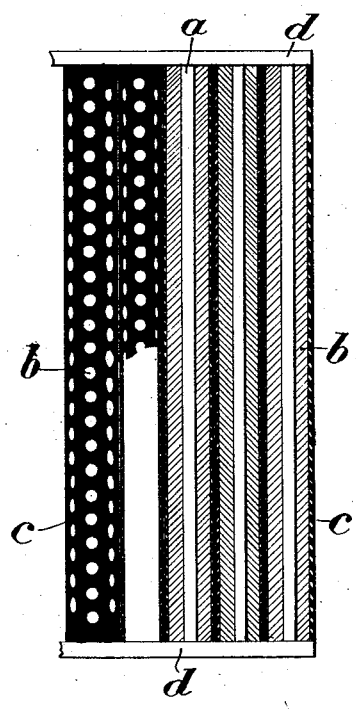
Inventor
A. Strasser
by Langner, Parry, Yard & Langner
Att'ys.

Patented Oct. 27, 1925.

1,559,471

UNITED STATES PATENT OFFICE.

ALBERT STRASSER, OF RORSCHACH, SWITZERLAND.

LEAD ELECTRODE FOR ACCUMULATORS.

Application filed March 5, 1924. Serial No. 697,047.

*To all whom it may concern:*

Be it known that I, ALBERT STRASSER, a citizen of the Swiss Republic, and resident of Rorschach, Switzerland, have invented new and useful Lead Electrodes for Accumulators, of which the following is a full, clear, and exact specification.

It is known in the manufacture of electrodes for accumulators to alloy lead with antimony and to expel the alloying metal (antimony) from the alloy by mechanical way, such as for example by centrifugal action, to obtain a porous lead mass. This process has the drawback that there will be formed irregular hollow spaces within the lead which are injurious to the life and service of an accumulator built up with such electrodes.

The present invention relates to an improved lead electrode for accumulators and a process for its manufacture, which has been suggested from another point of view.

The improved lead electrode comprises a number of parallel rods having each an active lead mass obtained from a lead alloy in porous structure throughout and in recrystallized state by extracting the alloying metal from said alloy, said lead mass being enclosed within a perforated insulating tube.

The process for the manufacture of such a lead electrode consists in alloying metallic lead with an alkali metal capable of reducing water, then introducing this alloy into perforated insulating tubes to obtain electrode rods, thereupon assembling a number of such rods together to form a solid structure and finally dipping this structure for a sufficient time into water to fully extract the alkali metal from the alloy and to thus give to the active mass a uniform porosity throughout with recrystallization of lead.

As alkali metal I preferably employ metallic sodium; but also any other convenient alkali or earth alkali metal can be used, provided that it is capable of reducing water. With a lead-sodium alloy, about 80 per cent of lead and 20 per cent of metallic sodium may be employed.

An electrode accumulator built up with electrodes of the kind above described shows in comparison to other known standard accumulator types at a higher average discharge tension and at approximately the same weight a greater capacity which may be for about ⅓ greater than the normal one. When being regularly discharged, its output is much greater than that of normal types.

The accompanying drawing shows by way of example an embodiment of the improved lead electrode, partly in elevation, partly by longitudinal section.

The electrode rods parallel to each other consist each of a metallic core $a$, for example of lead-antimony, the porous lead mass $b$ surrounding said core, and the outer perforated insulating tube $c$. The rods thus formed are connected together by upper and lower transverse heads $d$.

In the manufacture, the lead-sodium alloy to be used can be poured in liquid state into the insulating tube $c$ around the metallic core $a$. Thereupon, the required number of electrode rods thus obtained are placed side by side to form a plate-like structure and the whole is dipped for a sufficient time into water, until development of hydrogen no more takes place, which will be the case after 12 to 15 hours. During this time, the water extracts fully the sodium from the alloy and there is formed in the rods a porous, spongious active lead mass. The plate is ready for use.

What I claim is:

1. A process for the manufacture of lead electrodes for accumulators, consisting in alloying metallic lead with an alkali metal capable of reducing water, then introducing this alloy into perforated insulating shells and finally dipping these shells for a sufficient time into water to fully extract the alkali metal from the alloy and to thus give to the active mass a uniform porosity throughout with recrystallization of lead.

2. A process for the manufacture of lead electrodes for accumulators, consisting in alloying metallic lead with an alkali metal capable of reducing water, then introducing this alloy into perforated insulating tubes to obtain electrode rods, thereupon assembling a number of such rods together to form a solid structure and finally dipping this structure for a sufficient time into water to fully extract the alkali metal from the alloy and to thus give the active mass a uniform porosity throughout with recrystallization of lead.

In witness whereof I have hereunto signed my name this 19th day of February 1924.

ALBERT STRASSER.